United States Patent [19]

Pfiffner et al.

[11] Patent Number: 5,538,634
[45] Date of Patent: Jul. 23, 1996

[54] SOLID PHASE EXTRACTION FILTRATION DISK AND METHOD FOR ITS MANUFACTURE

[76] Inventors: Tim E. Pfiffner; Steve M. Shatkin, both of P.O. Box 6089, Santa Rosa, Calif. 95406

[21] Appl. No.: 430,766

[22] Filed: Apr. 27, 1995

[51] Int. Cl.[6] ............................................. B01D 39/00
[52] U.S. Cl. .................... 210/500.26; 210/198.3; 210/502.1; 210/505; 264/451; 264/257; 501/55
[58] Field of Search ................ 210/500.26, 505, 210/502.1, 198.3, 500.25; 501/39, 53, 55; 264/42, 45.1, 257

[56] References Cited

U.S. PATENT DOCUMENTS

| | | | |
|---|---|---|---|
| Re. 32,107 | 4/1986 | January | 501/55 |
| 3,455,818 | 7/1969 | Leifield | 210/502.1 |
| 3,904,422 | 9/1975 | Eaton | 501/39 |
| 4,789,479 | 12/1988 | Onitsuka et al. | 210/505 |
| 4,971,736 | 11/1990 | Hagen et al. | 264/41 |
| 5,403,489 | 4/1995 | Hagen et al. | 210/502.1 |

*Primary Examiner*—Ana Fortuna
*Attorney, Agent, or Firm*—Larry D. Johnson

[57] ABSTRACT

A solid phase extraction (SPE) filtration disk provides a glass fiber disk embedded with bonded silica/particulate chemistries homogeneously dispersed throughout the disk. Bonded silica/particulate chemistries are added to the glass fibers (and acidified water/solvent solution) during the formation of the glass fiber paper, as opposed to after the formation of the glass fiber paper. This enables homogenous dispersion of silica throughout the entire depth of the filtration disk.

4 Claims, 1 Drawing Sheet

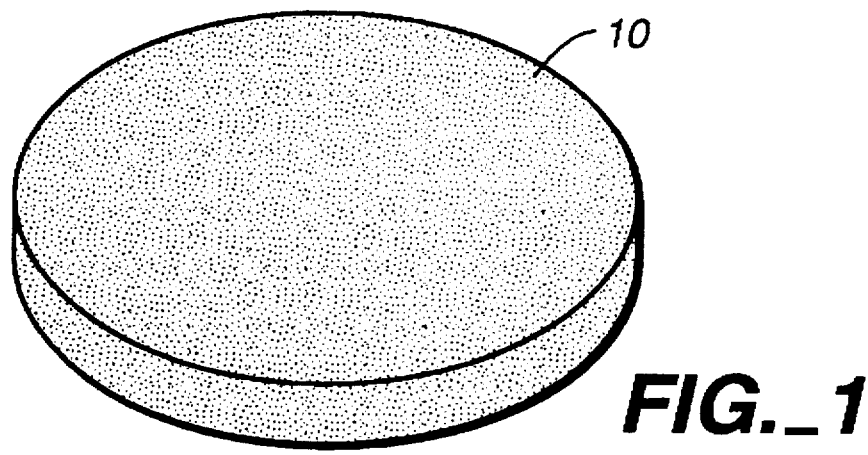
FIG._1
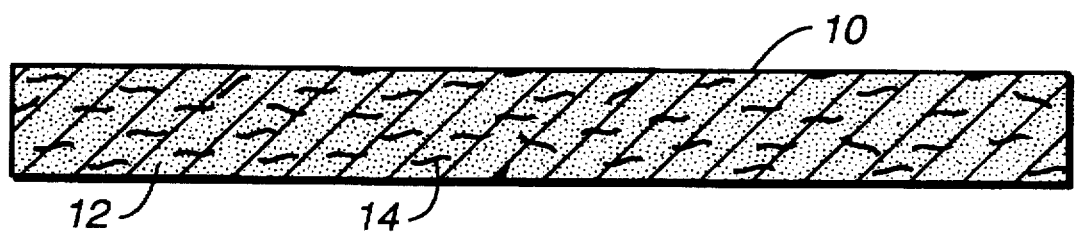
FIG._2

SOLID PHASE EXTRACTION FILTRATION DISK AND METHOD FOR ITS MANUFACTURE

BACKGROUND OF THE INVENTION

1. Field of the Invention

This invention relates generally to sample testing products and techniques, and more specifically to an improved solid phase extraction (SPE) filtration disk and a method for its manufacture.

2. Description of the Prior Art

Within the environmental testing arena laboratories are faced with a multitude of sample testing methods and techniques for the analysis of drinking water, waste water, and hazardous waste. These testing methods are typically approved and compiled with Environmental Protection Agency (EPA) documents, and serve as a basis by which the laboratory can determine the appropriate test method for detecting the presence and concentration of various compounds of interest. With regards to these test methods, technological advances are frequently achieved prior to and in conjunction with the revision of such published methods, thereby allowing for a laboratory to take advantage of the "best available technology" (BAT).

The recent advances in the field of Solid Phase Extraction (SPE) technology has allowed for laboratories to perform certain extraction methods in a safer, more economical, and a more time saving manner than previous standard methods. The information to follow will discuss a prior extraction method and current SPE technology.

Current methods for the extraction of pesticides, herbicides, and semi-volatile compounds from various matrices, (such as drinking water, waste water, or hazardous waste), call for the use of liquid/liquid extraction (L/L), in which a solvent is used that is relatively non-polar with respect to the compounds of interest. The solvent is mixed with the sample matrix and the compounds of interest form intermolecular interactions based on hydrogen bonding with the solvent. The solvent which now contains the compounds of interest is then removed from the sample matrix, concentrated, and analyzed via the appropriate analytical instrument. The most common problems faced by laboratories employing this method are with regards to excess analytical interference, low compound recoveries, the use of large volumes of solvents (typically chlorinated carcinogenic suspects), and lengthy extraction times (up to several hours per sample).

In response to these problems the EPA now allows for liquid/solid (L/S) extraction. Using SPE techniques, a sample matrix (specifically drinking water) is passed through a plastic column that is filled with one of several sorbent beds depending on the compounds of interest. The plastic column is attached to a vacuum from the bottom, and the sample matrix is drawn through the column. The compounds of interest are then absorbed onto the sorbent based on polar/non-polar interactions. A small volume of non-polar solvent (relative to the sorbent bed), is then passed through the column, thus removing the compounds of interest while leaving less desirable polar compounds in the sorbent. The eluent is then concentrated and analyzed by the appropriate analytical instrument. This method has been effective in reducing certain analytical interferences, solvent usage, and extraction time, however, it is not without its drawbacks. Typical problems encountered with the use of SPE columns are with respect to: specific analytical interferences due to the plastic columns (phthalate esters), low recoveries resulting from channeling effects under high vacuum that create a path of least resistance not allowing for adequate absorption of the compounds of interest, and column clogging due to high particulate laden matrices.

Current SPE technology addresses the problems described above by the employment of a SPE disk impregnated with a singular sorbent. The standard SPE disk is manufactured using a Teflon material to which a sorbent is incorporated. The principle of reversed phase SPE is employed to extract aqueous samples in the same manner as described above. The Teflon disk provides adequate compound recoveries, however, it is extremely susceptible to clogging by seemingly clean aqueous samples, requiring many hours of aspiration under high vacuum. Alternatively, another manufacturer has produced a SPE disk using glass fiber filter paper. It has been determined from scanning electron micrographs (SEM) that this product is produced by pouring sorbent material on top of a pre-made filter paper, and then aspirating the paper with vacuum to create a caked layer of sorbent on top of the paper. This particular product has been reported to leak, crack, and provide less than adequate compound recoveries.

Accordingly, it is an object of this invention to provide the laboratory industry with a more reliable, leak proof filtration disk that would maintain high flow rates with particulate laden aqueous samples, without compromising compound recovery.

SUMMARY OF THE INVENTION

The improved solid phase extraction (SPE) filtration disk of this invention provides a glass fiber disk embedded with silica compounds homogeneously dispersed throughout the disk. The design of the inventive filtration disk is inherently unique with respect to its process of manufacturing. Essentially, silica compounds are added to the glass fibers during the formation of the glass fiber paper, as opposed to after the formation of the glass fiber paper. This approach allows for the homogenous dispersion of silica throughout the entire depth of the filtration disk. The final product is a strong, flexible disk with excellent depth filtration properties and compound recovery characteristics. Due to the flexibility of the inventive disk, compressibility can be achieved, which substantially improves sealing characteristics not found in other SPE products. This novel characteristic plays an important role in consistent and accurate laboratory testing, by allowing all of the aqueous sample to remain in the testing vessel.

BRIEF DESCRIPTION OF THE DRAWINGS

FIG. 1 is a perspective view of an improved solid phase extraction filtration disk of this invention; and FIG. 2 is an enlarged side elevation cross-sectional view of the filtration disk of this invention, illustrating a quantity of chemistries homogeneously dispersed throughout the raw glass fibers of the disk.

DETAILED DESCRIPTION OF A PREFERRED EMBODIMENT

FIG. 1 is a perspective view of an improved solid phase extraction filtration disk 10 of this invention, while FIG. 2 is an enlarged side elevation cross-sectional view of the filtration disk 10 illustrating a quantity of chemistries 12 homogeneously dispersed throughout the raw glass fibers 14 of the disk 10.

The method for the manufacture of the inventive disk involves known chemistry and technology uniquely applied for the specific purpose of forming a glass fiber disk embedded with bonded silica/particulate chemistries. A weighed amount of raw glass fibers are placed into a glass or metallic vessel whereby the bottom of the vessel is made of a metallic screen. The screen is sealed from the bottom with a Teflon or metallic cover to prevent the fibers from escaping. At this point one of several silica sorbent materials is added to the vessel depending upon the compounds of interest to be absorbed. The sorbent materials include, but are not limited to, carbon-18 bound silica, carbon-8, polystyrenedivinylbenzene, and tertiary amine bound silica. The silica material is added by weight to the vessel to yield a 30 to 90 percent silica fiber product. Specifically, an 8–40 um irregular or round, 60–100 A silica based compound is used to achieve the proper adsorption properties required for the inventive disk.

Due to the extremely hydrophobic nature of the bonded silica/particulate chemistries, a volume of acidified aqueous solution of alcohol and water is added to the vessel containing the fibers and bonded silica/particulate chemistries. Specifically, methanol, ethanol, and/or isopropyl alcohol in concentrations of 10, 20, 30 and/or 40 percent or higher is added to the vessel. The use of the alcoholic solution allows for the homogenous dispersion of the bonded silica/particulate chemistries within the solution. The use of acidified solution etches the glass fibers, increasing the binding properties of the fibers. The contents of the vessel are agitated either by hand, or by using a mechanical device to achieve a homogenous glass fiber/bonded silica/particulate chemistries mixture. The sealing material on the bottom of the screen is then removed and the mixture is aspirated by vacuum. The formed material is then removed from the screen and allowed to dry either by air or an electrically heated drying device. The resulting product is a flexible glass fiber disk with a chemically bound bonded silica/particulate chemistries material homogenous throughout the disk. A similar process could be attained by running this formula on a typical "paper making" mill or machine.

The unique resulting properties of the inventive filtration disk are related to the novel approach of embedding the bonded silica/particulate chemistries with the glass fibers as the disk is being created. By adding the bonded silica/particulate chemistries to the fibers before the disk is produced, the inventive disk has been demonstrated to overcome the previously discussed problems associated with other SPE products. Due to the homogeneity and depth dispersion of the silica the effects of channeling are eliminated, resulting in compound recoveries of 80–120 percent. Additionally, the depth filtration properties allows for an aqueous sample to pass through the disk within minutes, without compromising compound recoveries even with a moderate concentration of particulate matter. The sealing characteristics of the inventive disk are enhanced due to the flexibility of the disk allowing for an excellent seal to be made between the disk and the disk holding apparatus.

The chemistry involved does not dictate that the silica compound be bound to the glass fibers, but rather, the bonded silica/particulate chemistries are trapped, or embedded. Because of this simple interaction a disk with the unique properties as described above are produced that will greatly improve current extraction methods.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. A solid phase extraction (SPE) filtration disk comprising:
   a glass fiber filtration disk embedded with a bonded silica/particulate chemistries sorbent material homogeneously dispersed throughout said disk; said bonded silica/particulate chemistries sorbent material selected from the group consisting of carbon-18 bound silica, carbon-8 bound silica, polystyrenedivinylbenzene bound silica, and tertiary amine bound silica.

2. The filtration disk of claim 1 wherein said homogeneously dispersed silica sorbent material comprises between 30 to 90 percent of said disk.

3. A method for the manufacture of a solid phase extraction (SPE) filtration disk, said method comprising the steps of:
   placing a quantity of raw glass fibers into a vessel having a bottom including a screen;
   sealing said screen from the bottom with a cover member;
   adding to said raw glass fibers one silica sorbent material selected from the group consisting of carbon-18 bound silica, carbon-8 bound silica, polystyrenedivinylbenzene bound silica, and tertiary amine bound silica;
   adding a volume of acidified aqueous solution of alcohol and water to said vessel containing said raw glass fibers and silica sorbent material;
   agitating the contents of said vessel to achieve a homogenous glass fiber/silica sorbent material mixture;
   removing said cover member from the bottom of said screen;
   aspirating said vessel from the bottom with a vacuum;
   removing the formed mixture from said screen; and
   drying the formed mixture to yield a glass fiber disk with a chemically bound silica sorbent material homogeneously dispersed throughout said disk.

4. The method for the manufacture of a solid phase extraction (SPE) filtration disk of claim 3 wherein said step of adding to said raw glass fibers one silica sorbent material comprises adding a silica sorbent material to yield a fiber product of between 30 to 90 percent silica sorbent material.

* * * * *